(12) United States Patent
Konishi

(10) Patent No.: US 9,470,853 B2
(45) Date of Patent: Oct. 18, 2016

(54) OPTICAL TRANSMISSION MODULE AND METHOD OF MANUFACTURING OPTICAL TRANSMISSION MODULE

(71) Applicant: MURATA MANUFACTURING CO., LTD., Kyoto-fu (JP)

(72) Inventor: Atsushi Konishi, Kyoto-fu (JP)

(73) Assignee: Murata Manufacturing Co., Ltd., Kyoto-Fu (JP)

( * ) Notice: Subject to any disclaimer, the term of this patent is extended or adjusted under 35 U.S.C. 154(b) by 0 days.

(21) Appl. No.: 14/628,695

(22) Filed: Feb. 23, 2015

(65) Prior Publication Data

US 2015/0247984 A1 Sep. 3, 2015

(30) Foreign Application Priority Data

Feb. 28, 2014 (JP) ................................. 2014-038737

(51) Int. Cl.
G02B 6/42 (2006.01)
(52) U.S. Cl.
CPC ............ G02B 6/4214 (2013.01); G02B 6/4206 (2013.01); G02B 6/4227 (2013.01); G02B 6/4246 (2013.01); G02B 6/4292 (2013.01); Y10T 29/49826 (2015.01)
(58) Field of Classification Search
CPC G02B 6/4214; G02B 6/4206; G02B 6/4227; G02B 6/4246; G02B 6/4292; Y10T 29/49826
See application file for complete search history.

(56) References Cited

U.S. PATENT DOCUMENTS 5,857,049 A * 1/1999 Beranek ............... G02B 6/4225
385/88
5,883,988 A * 3/1999 Yamamoto ............... G02B 6/42
250/227.15
6,112,002 A * 8/2000 Tabuchi ............... G02B 6/4249
385/124
6,404,960 B1 * 6/2002 Hibbs-Brenner ........ G02B 6/26
385/49

(Continued)

FOREIGN PATENT DOCUMENTS

JP 2001-108863 A 4/2001
JP 2004-303876 A 10/2004

(Continued)

OTHER PUBLICATIONS

An Office Action; "Notice of Reason for Rejection," issued by the Japanese Patent Office on Jul. 26, 2016, which corresponds to Japanese Patent Application No. 2014-038737 and is related to U.S. Appl. No. 14/628,695; with English language translation.

*Primary Examiner* — Peter Radkowski
(74) *Attorney, Agent, or Firm* — Studebaker & Brackett PC

(57) ABSTRACT

A method of manufacturing an optical transmission module includes temporary disposing, measuring, and placing steps. The temporary disposing step includes temporarily disposing a light-emitting-element receptacle over a mounting substrate so that a lens of the light-emitting-element receptacle and a light emitting element array face each other. The measuring step includes measuring the position of a light spot at which light emitted from the light-emitting element array emerges from the emergence surface of the light-emitting-element receptacle. The placing step includes placing the light-emitting-element receptacle over the mounting substrate on the basis of information on the position of a designed intersection point of the optical axis of an optical cable with the emergence surface of the light-emitting-element receptacle, and information on the position of the light spot.

2 Claims, 17 Drawing Sheets

(56) References Cited

U.S. PATENT DOCUMENTS

| | | | |
|---|---|---|---|
| 6,512,642 B1 * | 1/2003 | Bourcier | G02B 7/023 29/464 |
| 6,550,984 B2 * | 4/2003 | Andersen | G02B 6/29373 385/33 |
| 6,692,161 B2 * | 2/2004 | Zaborsky | G02B 6/4201 385/92 |
| 6,709,607 B2 * | 3/2004 | Hibbs-Brenner | G02B 6/26 216/24 |
| 7,008,120 B2 * | 3/2006 | Zaborsky | G02B 6/4201 385/89 |
| 7,104,703 B2 * | 9/2006 | Nagasaka | G02B 6/4204 355/52 |
| 7,255,491 B2 * | 8/2007 | Takagi | G02B 6/4225 385/88 |
| 8,079,125 B2 | 12/2011 | Ban et al. | |
| 8,987,655 B2 | 3/2015 | Sasada et al. | |
| 2002/0067899 A1 * | 6/2002 | Andersen | G02B 6/29373 385/93 |
| 2002/0150354 A1 * | 10/2002 | Zaborsky | G02B 6/4201 385/92 |
| 2002/0181882 A1 * | 12/2002 | Hibbs-Brenner | G02B 6/26 385/52 |
| 2003/0011899 A1 * | 1/2003 | Bourcier | G02B 7/023 359/813 |
| 2004/0022487 A1 * | 2/2004 | Nagasaka | G02B 6/4204 385/31 |
| 2004/0033031 A1 * | 2/2004 | Zaborsky | G02B 6/4201 385/89 |
| 2005/0047475 A1 * | 3/2005 | Takagi | G02B 6/4225 372/109 |

FOREIGN PATENT DOCUMENTS

| | | |
|---|---|---|
| JP | 2008-40318 | 2/2008 |
| JP | 2013-131637 | 7/2013 |
| JP | 2013-178348 | 9/2013 |
| WO | 2013/053708 A1 | 4/2013 |

* cited by examiner

OPTICAL TRANSMISSION MODULE AND METHOD OF MANUFACTURING OPTICAL TRANSMISSION MODULE

CROSS REFERENCE TO RELATED APPLICATIONS

This application claims benefit of priority to Japanese Patent Application No. 2014-038737 filed Feb. 28, 2014, the entire content of which is incorporated herein by reference.

TECHNICAL FIELD

The present technical field relates to an optical transmission module for optically coupling an optical cable and a photoelectric conversion element, and a method of manufacturing an optical transmission module.

BACKGROUND

In related art, as a method of manufacturing an optical transmission module for optically coupling an optical cable and a photoelectric conversion element, for example, there exists a manufacturing method using the optical transmission module tester described in Japanese Unexamined Patent Application Publication No. 2001-108863. In this type of manufacturing method (to be referred to as "manufacturing method according to related art" hereinafter), two optical transmission module components are moved to the left/right, up/down, and forward/backward, and then further rotated to optically couple the two optical transmission module components. Because the manufacturing method according to related art involves not only three-dimensionally moving but also rotating the two optical transmission module components in this way, a complicated operation process is required.

SUMMARY

Accordingly, it is an object of the present disclosure to provide an optical transmission module that makes it possible to facilitate optical coupling between an optical cable and a photoelectric conversion element, and a method of manufacturing the optical transmission module.

According to preferred embodiments of the present disclosure, there is provided a method of manufacturing an optical transmission module, the optical transmission module being connected to an optical cable, the optical transmission module including a mounting substrate, a photoelectric conversion element provided on the mounting substrate, and a receptacle that optically couples the photoelectric conversion element and the optical cable, the receptacle having a lens provided on a surface that faces the photoelectric conversion element. The method including temporarily disposing the receptacle over the mounting substrate so that the lens and the photoelectric conversion element face each other, measuring, after temporarily disposing, a position of a light spot at which light emitted from the photoelectric conversion element emerges from an emergence surface of the receptacle, and placing the receptacle over the mounting substrate, on the basis of information on a position of a designed intersection point of an optical axis of the optical cable with the emergence surface of the receptacle, and information on the position of the light spot.

According to preferred embodiments of the present disclosure, there is provided an optical transmission module which is connected to an optical cable, including a mounting substrate, a photoelectric conversion element provided on the mounting substrate, and a receptacle that optically couples the photoelectric conversion element and the optical cable. The receptacle has a lens provided on a surface that faces the photoelectric conversion element. The photoelectric conversion element has an optical axis that is separated by a predetermined distance from a center point of the lens, when seen in plan view from a direction parallel to the optical axis.

In the method of manufacturing an optical transmission module according to preferred embodiments of the present disclosure, first, the receptacle is temporarily disposed over the mounting substrate so that the lens provided to the receptacle and the photoelectric conversion element face each other. Thereafter, the receptacle is moved and placed over the mounting substrate on the basis of information on the position of a light spot at which light emerges from the emergence surface of the receptacle, and information on the position of a designed intersection point of the optical axis of the optical cable with the emergence surface of the receptacle. During this movement, light from the photoelectric conversion element passes through the lens. Accordingly, the light from the photoelectric conversion element is refracted by the lens, and thus the direction of its optical axis changes. In the manufacturing method according to preferred embodiments of the present disclosure, this change in the direction of the optical axis is utilized to optically couple the photoelectric conversion element and the optical cable without rotating the receptacle.

According to preferred embodiments of the preset disclosure, optical coupling between the optical cable and the photoelectric conversion element may be facilitated.

Other features, elements, characteristics and advantages of the present disclosure will become more apparent from the following detailed description of preferred embodiments of the present disclosure with reference to the attached drawings.

DETAILED DESCRIPTION

Configuration of Optical Transmission Module; See FIGS. 1 to 3

Hereinafter, a configuration of an optical transmission module according to an embodiment will be described with reference to the drawings. In the following description, the direction from the top to bottom of an optical transmission module 10 is defined as the z-axis direction, and the direction along the long side of the optical transmission module 10 when seen in plan view from the z-axis direction is defined as the x-axis direction. Further, the direction along the short side of the optical transmission module 10 is defined as the y-axis direction. The x-axis, the y-axis, and the z-axis are perpendicular to each other.

Figure 1:
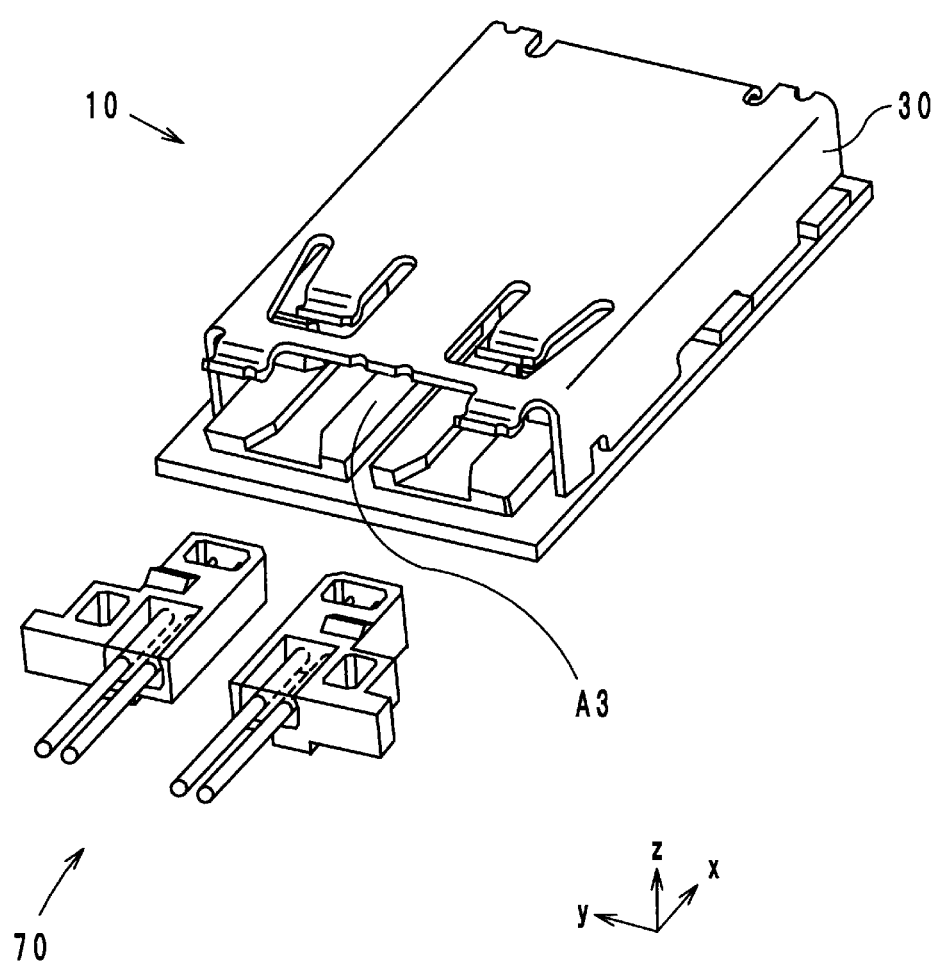
FIG. 1 is an external perspective view of an optical transmission module according to an embodiment.
Figure 2:
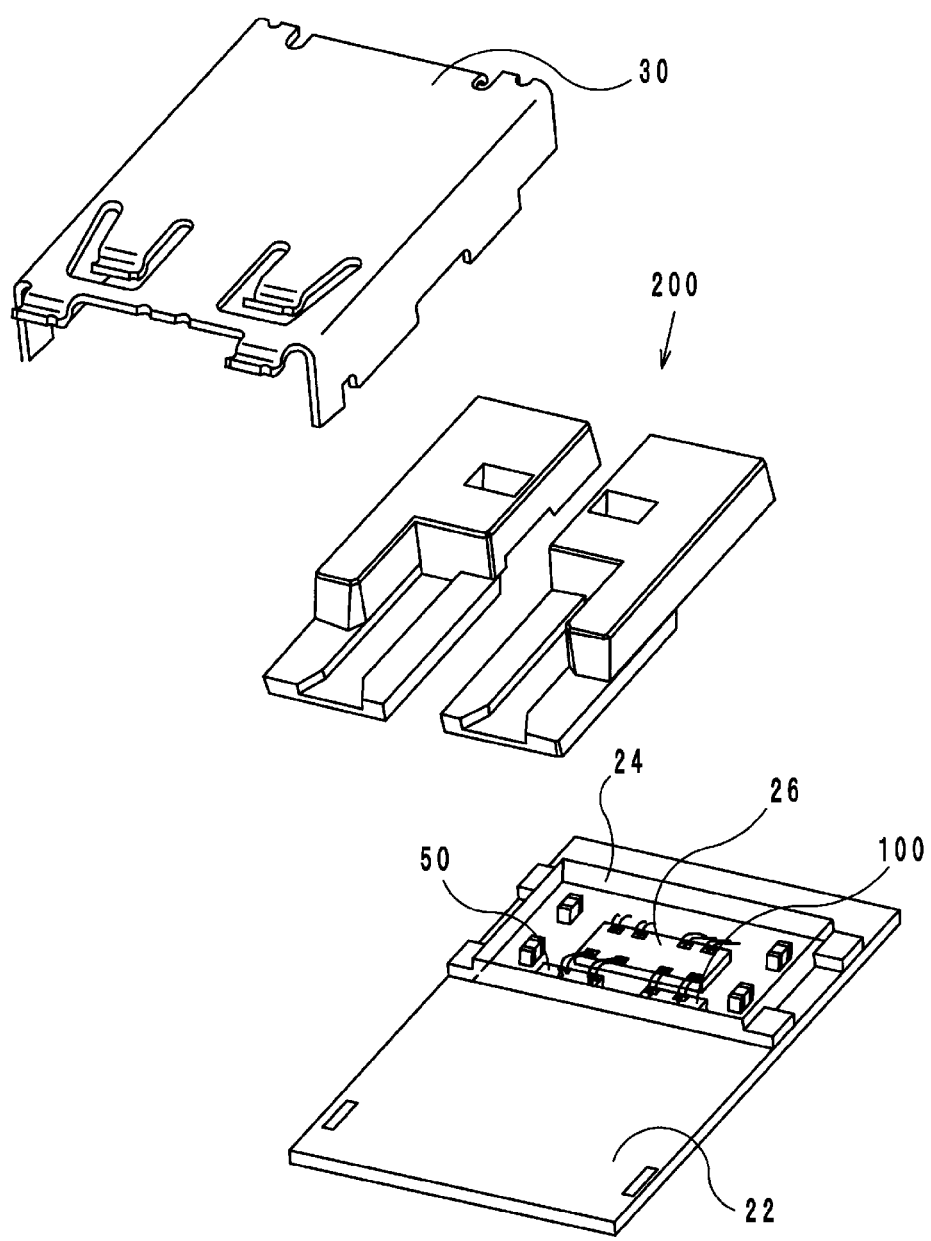
FIG. 2 is an exploded perspective view of the optical transmission module.
Figure 2:
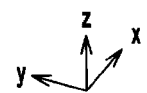

As illustrated in FIG. 1, an optical cable connection device 70 is connected to the optical transmission module 10. As illustrated in FIG. 2, the optical transmission module 10 includes a metal cap 30, a light-receiving element array (photoelectric conversion element) 50, a light-emitting element array (photoelectric conversion element) 100, a receptacle 200, a mounting substrate 22, a sealing resin 24, and a driving circuit 26.

Figure 3:
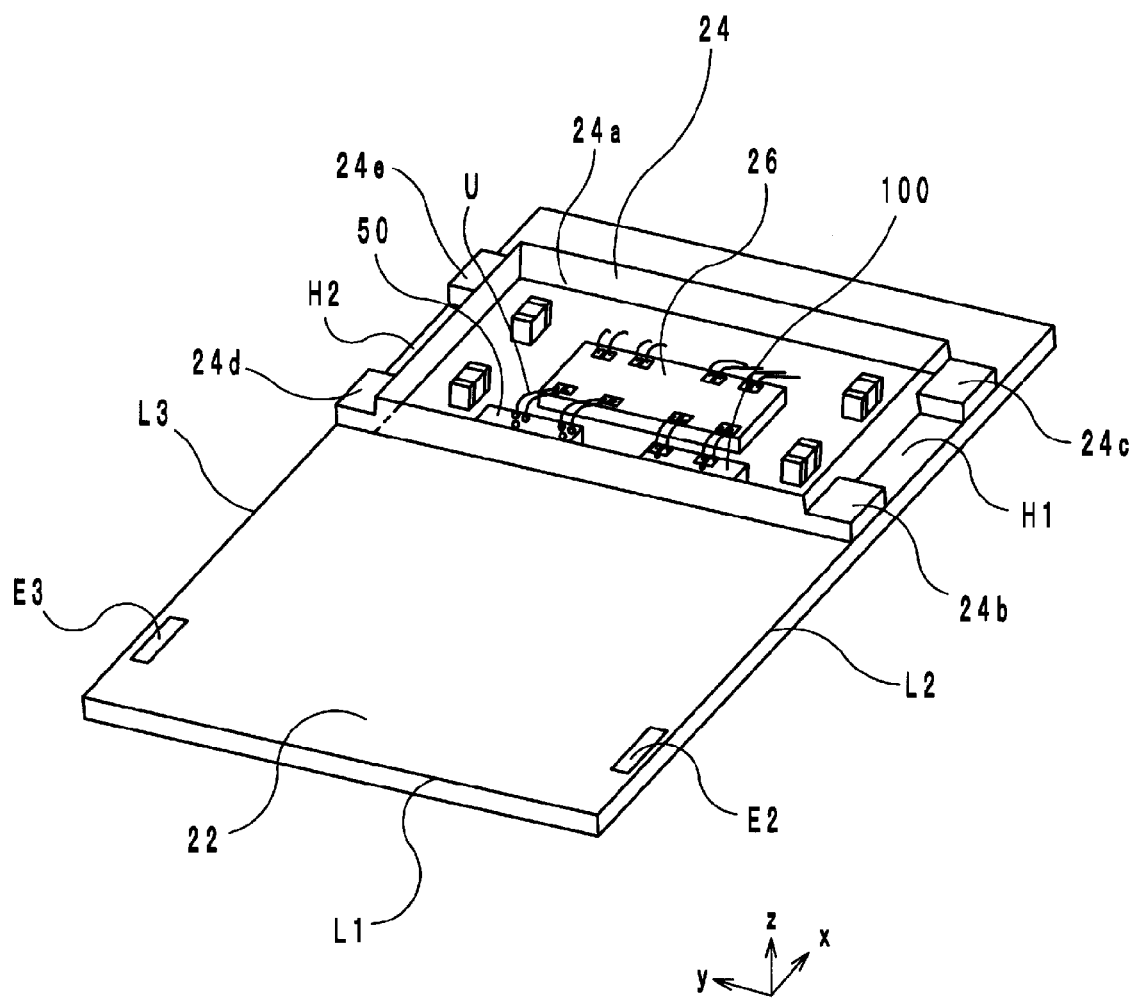
FIG. 3 is an external perspective view of the optical transmission module from which a metal cap and a receptacle are removed.

The mounting substrate 22 is a plate-like member made of a bismaleimide-triazine (BT) resin or the like. As illustrated in FIG. 3, the mounting substrate 22 has a substantially rectangular shape when seen in plan view from the z-axis direction. A surface-mounting electrode is provided on a surface located at the negative side of the z-axis direction of the mounting substrate 22 (hereinafter, the surface located at the negative side of the z-axis direction will be referred to as "lower surface"). The surface-mounting electrode comes into contact with a land on a circuit board when the optical transmission module 10 is mounted on the circuit board.

In a surface located at the positive side of the z-axis direction of the mounting substrate 22 (hereinafter, the surface located at the positive side of the z-axis direction will be referred to as "upper surface"), a ground-conductor exposed part E2 is provided near the corner formed by an outer edge L1 located at the negative side of the x-axis direction, and an outer edge L2 located at the negative side of the y-axis direction. In the ground-conductor exposed part E2, a ground conductor provided inside the mounting substrate 22 is partially exposed. When seen in plan view from the positive side of the z-axis direction, the ground-conductor exposed part E2 has a substantially rectangular shape whose long side lies in the x-axis direction.

Further, in the upper surface of the mounting substrate 22, a ground-conductor exposed part E3 is provided near the corner formed by the outer edge L1 and an outer edge L3, which is located at the positive side of the y-axis direction. In the ground-conductor exposed part E3, the ground conductor provided inside the mounting substrate 22 is partially exposed. When seen in plan view from the positive side of the z-axis direction, the ground-conductor exposed part E3 has a substantially rectangular shape whose long side lies in the x-axis direction.

The light-receiving element array 50 and the light-emitting element array 100 are provided in a portion located at the positive side of the x-axis direction in the upper surface of the mounting substrate 22. The light-receiving element array 50 is an element array including a plurality of photodiodes that convert an optical signal into an electrical signal. The light-emitting element array 100 is an element array including a plurality of diodes that convert an electrical signal into an optical signal.

In the upper surface of the mounting substrate 22, the driving circuit 26 is provided in a portion located further to the positive side of the x-axis direction than the light-receiving element array 50 and the light-emitting element array 100. The driving circuit 26 is a semiconductor circuit element for driving the light-receiving element array 50 and the light-emitting element array 100.

The driving circuit 26 has a substantially rectangular shape with a long side that is parallel to the y-axis direction when seen in plan view from the z-axis direction. The driving circuit 26 and the light-receiving element array 50 are connected by wire bonding via wires U. Further, the driving circuit 26 is also connected to the light-emitting element array 100 by wire bonding via the wires U. Consequently, an electrical signal from the driving circuit 26 is transmitted to the light-emitting element array 100 via the wires U, and an electrical signal from the light-receiving element array 50 is transmitted to the driving circuit 26 via the wires U.

The sealing resin 24 includes a sealing part 24a and leg parts 24b to 24e. The sealing resin 24 is made of a transparent resin such as an epoxy resin. The sealing part 24a has a substantially rectangular parallelepiped shape. The sealing part 24a is provided on the upper surface of the mounting substrate 22 so as to cover the light-receiving element array 50, the light-emitting element array 100, and the driving circuit 26.

The leg parts 24b and 24c of the sealing resin 24 are spaced from each other so as to be arranged in this order from the negative side toward the positive side of the x-axis direction. Each of the leg parts 24b and 24c is a substantially rectangular parallelepiped member that projects from a surface located at the negative side of the y-axis direction of the sealing part 24a, toward the outer edge L2 of the mounting substrate 22. A space H1 is provided between the leg part 24b and the leg part 24c. A projection C3 of the metal cap 30 described later is fit into the space H1.

The leg parts 24d and 24e of the sealing resin 24 are spaced from each other so as to be arranged in this order from the negative side toward the positive side of the x-axis direction. Each of the leg parts 24d and 24e is a substantially rectangular parallelepiped member that projects from a surface located at the positive side of the y-axis direction of the sealing part 24a, toward the outer edge L3 of the mounting substrate 22. A space H2 is provided between the leg part 24d and the leg part 24e. A projection C6 of the metal cap 30 described later is fit into the space H2.

Configuration of Receptacle; See FIGS. 4 to 7

Next, the receptacle 200 will be described with reference to the drawings.

Figure 4:
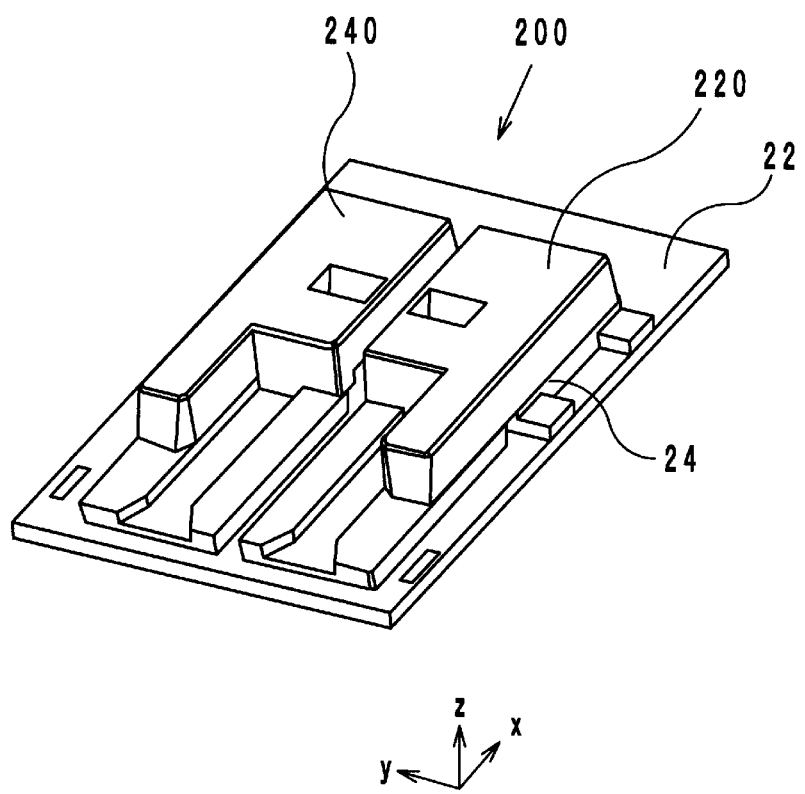
FIG. 4 is an external perspective view of the optical transmission module from which the metal cap is removed.

As illustrated in FIG. 4, the receptacle light-emitting-element receptacle 220 is provided so as to cover substantially the entirety of the upper surface of the mounting substrate 22 and the sealing resin 24. The receptacle 200 includes a light-emitting-element receptacle 220 and a lightreceiving-element receptacle 240. The light-emitting-element receptacle 220 and the light-receiving-element receptacle 240 are arranged in this order from the negative side toward the positive side of the y-axis direction. The light-emitting-element receptacle 220 and the light-receiving-element receptacle 240 are made of, for example, a light-transmitting resin such as an epoxy-based resin.

The light-emitting-element receptacle 220 has a substantially rectangular shape when seen in plan view from the z-axis direction. Further, as illustrated in FIG. 5, the light-emitting-element receptacle 220 has a plug placing part 222 and an optical coupling part 224.

Figure 6:
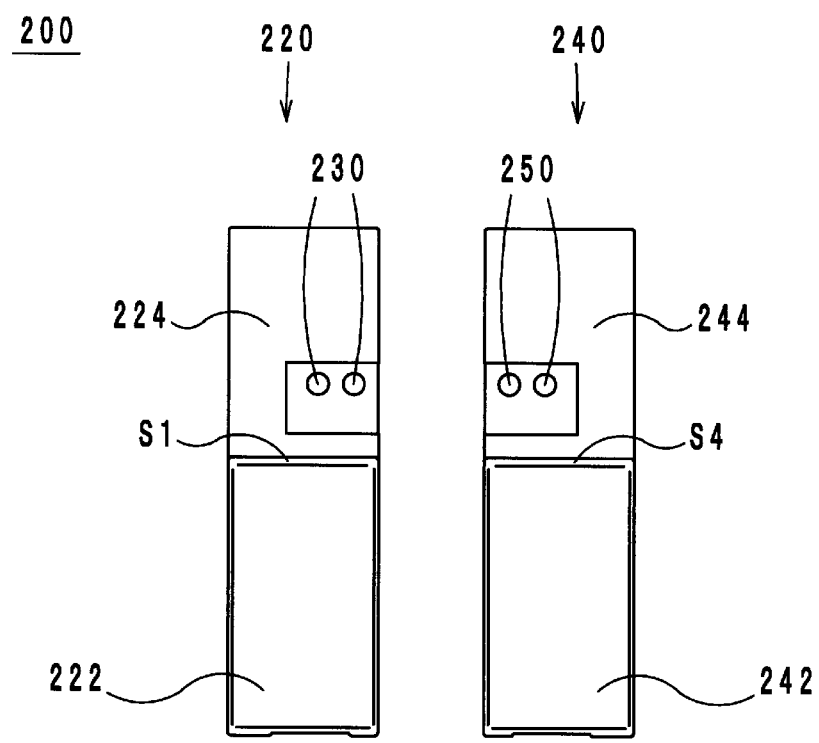
FIG. 6 is a bottom view, as seen from the negative side of the z-axis direction, of the receptacle included in the optical transmission module.
Figure 7:
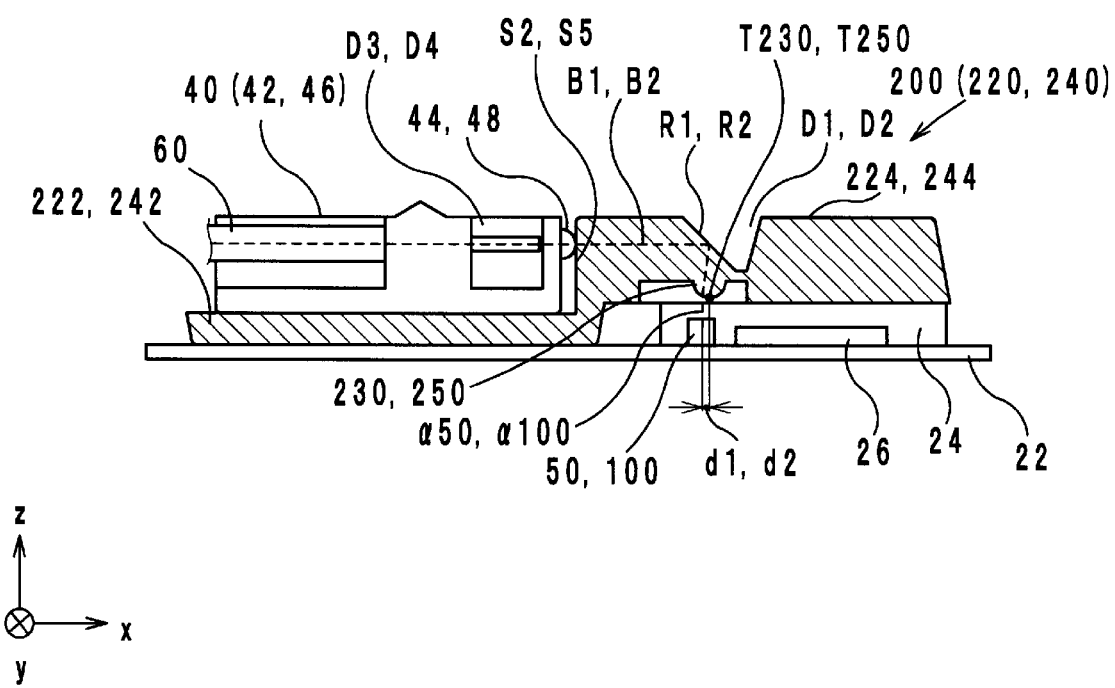
FIG. 7 illustrates a section taken along a line 1-1 or 2-2 of the receptacle illustrated in FIG. 5, with a mounting substrate and a plug being added.

The plug placing part 222 is a portion on which a transmitting-side plug 42 (see FIG. 9) provided in an end portion of at least one optical cable 60 is placed. The plug placing part 222 constitutes a portion located at the negative side of the x-axis direction of the light-emitting-element receptacle 220. Further, as illustrated in FIG. 6, the plug placing part 222 has a substantially rectangular shape when seen in bottom view from the z-axis direction. Furthermore, as illustrated in FIG. 7, the plug placing part 222 is located on the upper surface of the mounting substrate 22.

Figure 5:
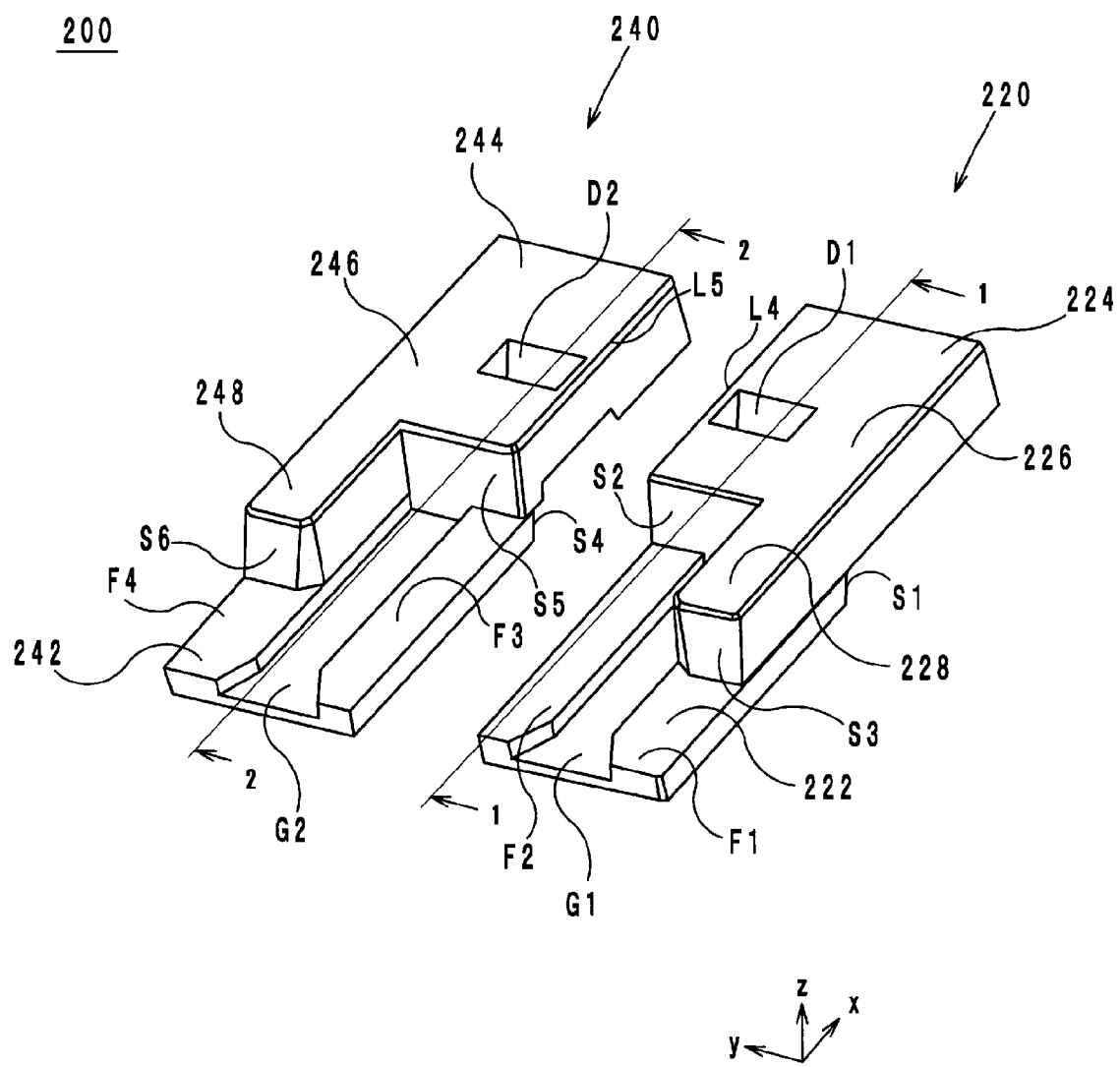
FIG. 5 is an external perspective view of the receptacle included in the optical transmission module.

As illustrated in FIG. 5, a groove G1 is provided at substantially the center of the y-axis direction in the upper surface of the plug placing part 222. The groove G1 extends along the direction in which the transmitting-side plug 42 is pushed in toward the optical coupling part 224, that is, the x-axis direction in this embodiment. Now, a portion located further to the negative side of the y-axis direction of the plug placing part 222 than the groove G1 is referred to as flat part F1, and a portion located further to the positive side of the y-axis direction of the plug placing part 222 than the groove G1 is referred to as flat part F2. An abutment part 228 having a substantially rectangular parallelepiped shape is provided in a region located at the positive side of the x-axis direction of the flat part F1. The abutment part 228 is a portion against which the transmitting-side plug 42 is abutted for positioning when the transmitting-side plug 42 is pushed in toward the optical coupling part 224.

As illustrated in FIG. 5, the optical coupling part 224 constitutes a portion located at the positive side of the x-axis direction of the light-emitting-element receptacle 220. The optical coupling part 224 has a substantially rectangular parallelepiped shape. Further, as illustrated in FIG. 7, the optical coupling part 224 is placed on the sealing resin 24. Furthermore, the optical coupling part 224 has a recess D1 and a convex lens 230.

As illustrated in FIG. 5, the recess D1 is provided near an outer edge L4 located at the positive side of the y-axis direction of the optical coupling part 224. When seen in plan view from the z-axis direction, the recess D1 overlaps the optical axis of the light-emitting element array 100. Further, when seen in plan view from the x-axis direction, the recess D1 overlaps the optical axis of the optical cable 60 connected to the transmitting-side plug 42. Furthermore, when seen in plan view from the z-axis direction, the recess D1 has a substantially rectangular shape, and when seen in plan view from the y-axis direction, the recess D1 is substantially V-shaped as illustrated in FIG. 7.

The inner peripheral surface located at the negative side of the x-axis direction of the recess D1 is a total reflection surface R1. The total reflection surface R1 extends in parallel to the y-axis. When seen in plan view from the negative side of the y-axis direction, the total reflection surface R1 is inclined counterclockwise at approximately 45° with respect to the z-axis. The refractive index of the light-emitting-element receptacle 220 is sufficiently greater than that of air. Accordingly, a laser beam B1, which is emitted from the light-emitting element array 100 using a vertical cavity surface emitting laser (VCSEL) or the like to the positive side of the z-axis direction along the optical axis of the light-emitting element array 100, enters the optical coupling part 224, and after total reflection at the total reflection surface R1, the laser beam B1 emerges from an emergence surface S2 located at the negative side of the x-axis direction of the optical coupling part 224, and travels to the optical cable 60 via a plug 40. That is, the light-emitting-element receptacle 220 uses reflection to align the optical axes of the light-emitting element array 100 and the optical cable 60, thereby optically coupling the optical cable 60 and the light-emitting element array 100.

As illustrated in FIGS. 6 and 7, the convex lens 230 is provided on the lower surface of the optical coupling part 224. When seen in plan view from the z-axis direction, the convex lens 230 overlaps the light-emitting element array 100. Accordingly, the convex lens 230 faces the light-emitting element array 100, and is located in the optical path of the laser beam B1. When seen in plan view from a direction perpendicular to the z-axis direction, the convex lens 230 has a substantially semicircular shape that protrudes toward the negative side of the z-axis direction. Accordingly, the laser beam B1 emitted from the light-emitting element array 100 is focused or collimated by the convex lens 230, and travels toward the total reflection surface R1. At this time, a center point (to be hereinafter referred to as "lens center") T230 of the convex lens 230 and an optical axis α100 of the light-emitting element array 100 are separated by a predetermined distance when seen in plan view from the z-axis direction (direction parallel to the optical axis). The optical axis α100 refers to the axis along which light emitted from the light-emitting element array 100 travels before reaching the convex lens 230.

The light-receiving-element receptacle 240 has a substantially rectangular shape when seen in plan view from the z-axis direction. Further, as illustrated in FIG. 5, the light-receiving-element receptacle 240 has a plug placing part 242 and an optical coupling part 244.

The plug placing part 242 is a portion on which a receiving-side plug 46 (see FIG. 9) provided in an end portion of the optical cable 60 is placed. The plug placing part 242 constitutes a portion located at the negative side of the x-axis direction of the light-receiving-element receptacle 240. Further, as illustrated in FIG. 6, the plug placing part 242 has a substantially rectangular shape when seen in bottom view from the z-axis direction. Furthermore, as illustrated in FIG. 7, the plug placing part 242 is located on the upper surface of the mounting substrate 22.

As illustrated in FIG. 5, a groove G2 is provided at substantially the center of the y-axis direction in the upper surface of the plug placing part 242. The groove G2 extends along the direction in which the receiving-side plug 46 is pushed in toward the optical coupling part 244, that is, the x-axis direction in this embodiment. Now, a portion located further to the negative side of the y-axis direction of the plug placing part 242 than the groove G2 is referred to as flat part F3, and a portion located further to the positive side of the y-axis direction of the plug placing part 242 than the groove G2 is referred to as flat part F4. An abutment part 248 having a substantially rectangular parallelepiped shape is provided in a region located at the positive side of the x-axis direction of the flat part F4. The abutment part 248 is a portion against which the receiving-side plug 46 is abutted for positioning when the receiving-side plug 46 is pushed in toward the optical coupling part 244.

As illustrated in FIG. 5, the optical coupling part 244 constitutes a portion located at the positive side of the x-axis direction of the light-receiving-element receptacle 240. The optical coupling part 244 has a substantially rectangular parallelepiped shape. Further, as illustrated in FIG. 7, the optical coupling part 244 is placed on the sealing resin 24. Furthermore, the optical coupling part 244 has a recess D2 and a convex lens 250.

The recess D2 is provided near an outer edge L5 located at the negative side of the y-axis direction of the optical coupling part 244. When seen in plan view from the z-axis direction, the recess D2 overlaps the light-receiving element array 50. Further, when seen in plan view from the x-axis direction, the recess D2 overlaps the optical axis of the optical cable 60 connected to the receiving-side plug 46. Furthermore, when seen in plan view from the z-axis direction, the recess D2 has a substantially rectangular shape, and when seen in plan view from the y-axis direction, the recess D2 is substantially V-shaped as illustrated in FIG. 7.

The inner peripheral surface located at the negative side of the x-axis direction of the recess D2 is a total reflection surface R2. The total reflection surface R2 extends in parallel to the y-axis. When seen in plan view from the negative side of the y-axis direction, the total reflection surface R2 is inclined counterclockwise at approximately 45° with respect to the z-axis. The refractive index of the light-receiving-element receptacle 240 is sufficiently greater than that of air. Accordingly, a laser beam B2, which is emitted from the optical cable 60 to the positive side of the x-axis direction along the optical axis of the optical cable 60, enters the optical coupling part 244 from an incidence surface S5 located at the negative side of the x-axis direction of the optical coupling part 244. The laser beam B2 is then totally reflected at the total reflection surface R2, and travels toward the light-receiving element array 50 via the sealing resin 24. That is, the light-receiving-element receptacle 240 uses reflection to align the optical axes of the light-receiving element array 50 and the optical cable 60, thereby optically coupling the optical cable 60 and the light-receiving element array 50.

As illustrated in FIGS. 6 and 7, the convex lens 250 is provided on the lower surface of the optical coupling part 244. When seen in plan view from the z-axis direction, the convex lens 250 overlaps the light-receiving element array 50. Accordingly, the convex lens 250 faces the light-receiving element array 50, and is located in the optical path of the laser beam B2. When seen in plan view from a direction perpendicular to the z-axis, the convex lens 250 has a substantially semicircular shape that protrudes toward the negative side of the z-axis direction. Accordingly, the laser beam B2 emitted from the optical cable 60 is reflected at the total reflection surface R2, and then the laser beam B2 is focused or collimated by the convex lens 250 and travels toward the light-receiving element array 50. At this time, a center point (to be hereinafter referred to as "lens center") T250 of the convex lens 250 and an optical axis α50 of the light-receiving element array 50 are separated by a predetermined distance when seen in plan view from the z-axis direction (direction parallel to the optical axis). The optical axis α50 refers to the axis along which light travels from the surface of the convex lens 250 before reaching the light-receiving element array 50.

Configuration of Metal Cap; See FIGS. 1 and 8

Next, the metal cap 30 will be described with reference to the drawings.

The metal cap 30 is fabricated by bending a single metal plate (for example, SUS301) into a substantially squared U-shape. As illustrated in FIG. 1, the metal cap 30 covers the receptacle 200 from the positive side of the z-axis direction and from both the positive and negative sides of the y-axis direction. An opening A3, into which the optical cable connection device 70 is inserted, is provided at the negative side of the x-axis direction of the receptacle 200.

Figure 8:
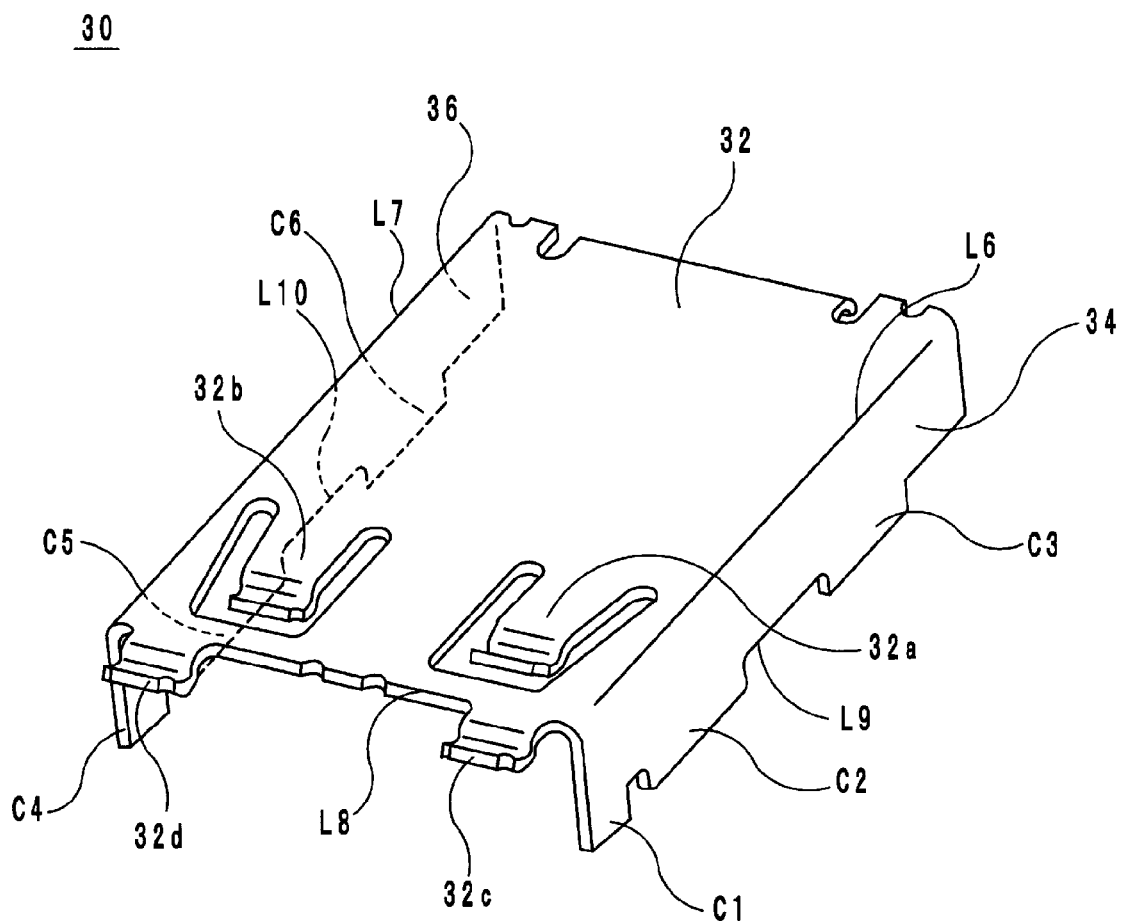
FIG. 8 is an external perspective view of the metal cap included in the optical transmission module.

As illustrated in FIG. 8, the metal cap 30 includes a top plate part 32, and side plate parts 34 and 36. The top plate part 32, which is parallel to a plane perpendicular to the z-axis, has a substantially rectangular shape. The side plate part 34 is formed by bending a sheet metal forming the metal cap 30 to the negative side of the z-axis direction from a long side L6 that is located at the negative side of the y-axis direction of the top plate part 32. The side plate part 36 is formed by bending the sheet metal forming the metal cap 30 to the negative side of the z-axis direction from a long side L7 that is located at the positive side of the y-axis direction of the top plate part 32.

Engagement parts 32a and 32b for fixing the plug 40 to the receptacle 200 are provided in a portion located at the negative side of the x-axis direction of the top plate part 32. The engaging parts 32a and 32b are arranged in this order from the negative side toward the positive side of the y-axis direction.

Each of the engaging parts 32a and 32b is formed by making a cut in the top plate part 32 in a substantially squared U-shape. Specifically, each of the engaging parts 32a and 32b is formed by making a cut in the top plate part 32 in a substantially squared U-shape that opens at the positive side of the x-axis direction, and bending the portion surrounded by the substantially squared U-shape cut so as to be recessed to the negative side of the z-axis direction. Consequently, when seen in plan view from the y-axis direction, the engaging parts 32a and 32b have a substantially V-shape that protrudes to the negative side of the z-axis direction.

A short side L8 located at the negative side of the x-axis direction of the top plate part 32 is provided with engaging parts 32c and 32d, which are used for fixing the plug 40 to the receptacle 200. Each of the engaging parts 32c and 32d is a metal strip that projects to the negative side of the x-axis direction from the top plate part 32. The engaging parts 32c and 32d are bent at substantially the center position of the x-axis direction of the engaging parts 32c and 32d, in such a way that the engaging parts 32c and 32d are recessed to the negative side of the z-axis direction. Consequently, when seen in plan view from the y-axis direction, the engaging parts 32c and 32d have a substantially V-shape that protrudes to the negative side of the z-axis direction.

A long side L9 located at the negative side of the z-axis direction of the side plate part 34 has projections C1 to C3 that project toward the negative side of the z-axis direction. The projections C1 to C3 are arranged in this order from the negative side toward the positive side of the x-axis direction. Each of the projections C1 to C3 is fixed to the mounting substrate 22 with an adhesive. The projection C1 is connected to the ground-conductor exposed part E2 of the mounting substrate 22. The projection C3 is fit into the space H1 provided between the leg part 24b and the leg part 24c of the sealing resin 24. As a result, the metal cap 30 is positioned with respect to the mounting substrate 22.

A long side L10 located at the negative side of the z-axis direction of the side plate part 36 has projections C4 to C6 that project toward the negative side of the z-axis direction. The projections C4 to C6 are arranged in this order from the negative side toward the positive side of the x-axis direction. Each of the projections C4 to C6 is fixed to the mounting substrate 22 with an adhesive. The projection C4 is connected to the ground-conductor exposed part E3 of the mounting substrate 22. The projection C6 is fit into the space H2 provided between the leg part 24d and the leg part 24e of the sealing resin 24. As a result, the metal cap 30 is positioned with respect to the mounting substrate 22.

Configuration of Optical Cable Connection Device; See FIGS. 9 and 10

Hereinafter, the optical cable connection device 70 according to an embodiment will be described with reference to the drawings. The optical cable connection device 70 includes the optical cable 60 and the plug 40.

The optical cable 60 includes a core wire and a covering material that covers the core wire. The core wire includes a core and a clad that are made of a resin such as a fluorine-based resin. Further, the covering material is made of a resin such as polyethylene.

Figure 9:
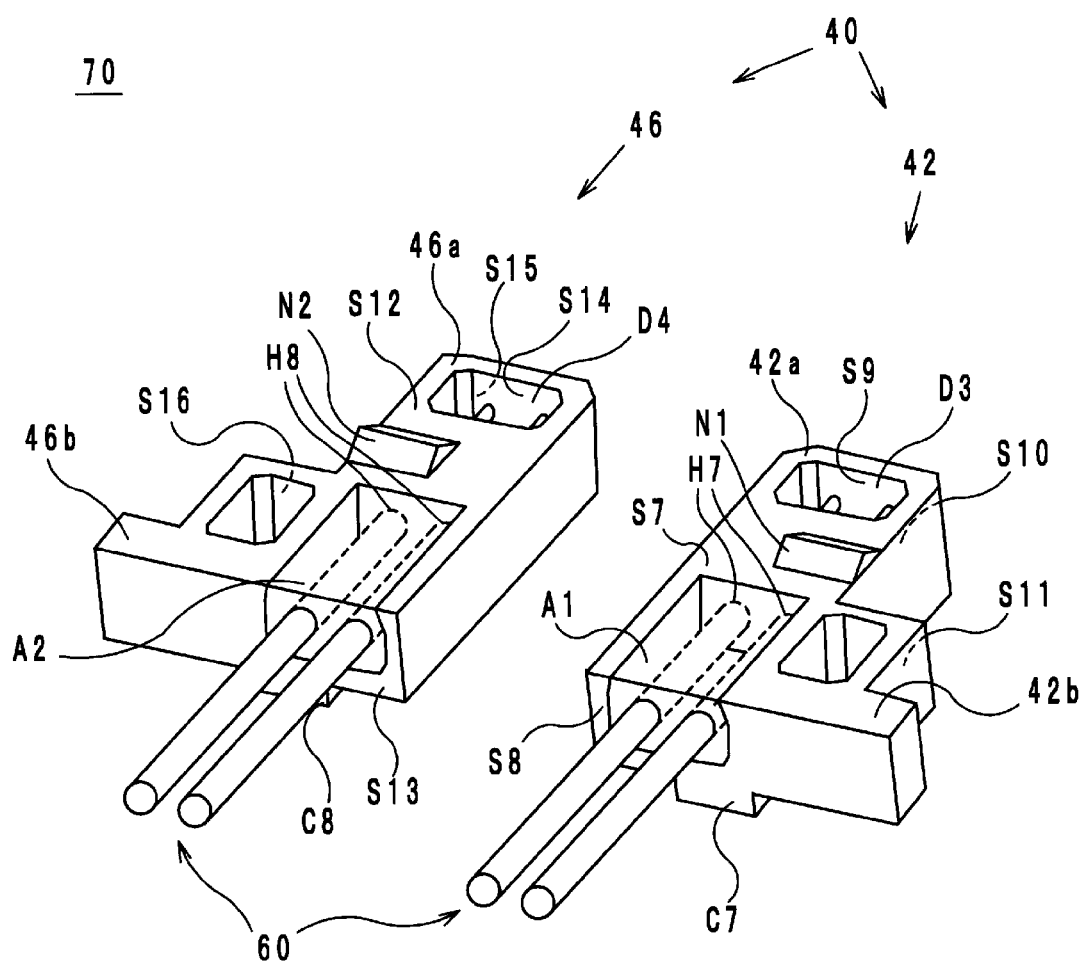
FIG. 9 is an external perspective view of an optical cable connection device.

As illustrated in FIG. 9, an end portion of the optical cable 60 is inserted into the plug 40. The plug 40 includes the transmitting-side plug 42 and the receiving-side plug 46. Both the transmitting-side plug 42 and the receiving-side plug 46 are made of, for example, an epoxy-based resin or nylon-based resin.

The transmitting-side plug 42 is used for fixing the optical cable 60 to the light-emitting-element receptacle 220. The transmitting-side plug 42 includes an optical cable insertion part 42a and a protrusion 42b.

The optical cable insertion part 42a constitutes a portion located at the positive side of the y-axis direction of the transmitting-side plug 42. The optical cable insertion part 42a has a substantially rectangular parallelepiped shape that extends in the x-axis direction. An opening A1 is provided in a portion located at the negative side of the x-axis direction of the optical cable insertion part 42a. The opening A1 is a slot for inserting the optical cable 60 into the transmitting-side plug 42. A resin for securing the optical cable 60 is injected into the opening A1.

The opening A1 is formed by being cut out of a surface S7 located at the top side of the optical cable insertion part 42a, and an end surface S8 located at the negative side of the x-axis direction of the optical cable insertion part 42a. At least one hole H7 is provided in the inner peripheral surface located at the positive side of the x-axis direction of the opening A1. The hole H7 is used for guiding the core wire of the optical cable 60 inserted in the opening A1 to the distal end of the transmitting-side plug 42. The number of holes H7 corresponds to the number of optical cables 60, which is two in this embodiment.

Further, a recess D3 for injecting a matching agent is provided in a portion located at the positive side of the x-axis direction of the optical cable insertion part 42a. A matching agent refers to a transparent resin used for matching the refractive indices of the optical cable 60 and the transmitting-side plug 42 to reduce refraction of light. The recess D3 is recessed from the top surface toward the lower surface of the optical cable insertion part 42a.

The hole H7 is provided in the inner peripheral surface located at the negative side of the x-axis direction of the recess D3. The hole H7 communicates with the inner peripheral surface located at the positive side of the x-axis direction of the opening A1. Accordingly, the core wire of the optical cable 60 reaches the recess D3 from the opening A1 by passing through the hole H7. The end surface of the core wire of the optical cable 60 that has reached the recess D3 is located in the immediate vicinity of an inner peripheral surface S9 located at the positive side of the x-axis direction of the recess D3. A matching agent made of a transparent resin, for example, an epoxy-based resin is injected into the opening A1 and the recess D3 to fix the optical cable 60 to the transmitting-side plug 42. The end surface of the core wire of the optical cable 60 is not in contact with the inner peripheral surface S9. This is to provide a gap for absorbing expansion and contraction of the optical cable 60 due to temperature fluctuations or the like.

Figure 10:
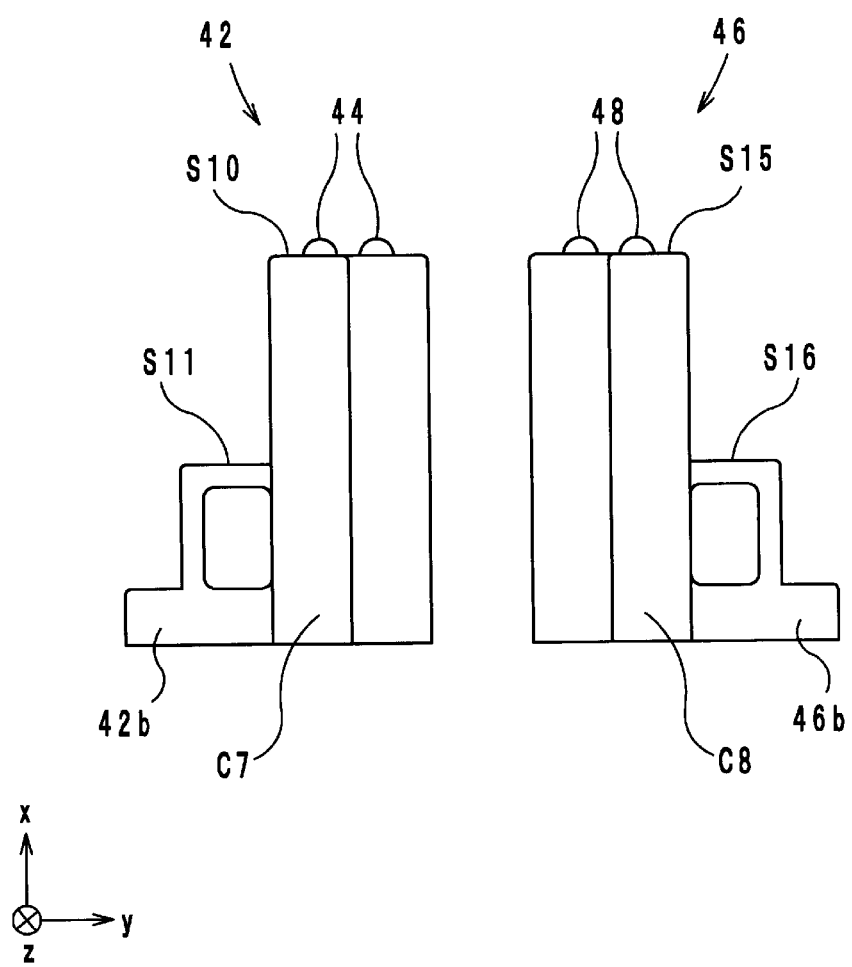
FIG. 10 is a bottom view, as seen from the negative side of the z-axis direction, of the plug included in the optical cable connection device.

As illustrated in FIG. 10, a convex lens 44 is provided on an end surface S10 located at the positive side of the x-axis direction of the optical cable insertion part 42a. When seen in plan view from a direction perpendicular to the x-axis direction, the convex lens 44 has a substantially semicircular shape that protrudes to the positive side of the x-axis direction. Accordingly, the laser beam B1 emitted from the light-emitting element array 100 and totally reflected at the total reflection surface R1 is focused or collimated by the convex lens 44.

When seen in plan view from the x-axis direction, the convex lens 44 overlaps the optical axis of the optical cable 60. Therefore, the laser beam B1 focused or collimated by the convex lens 44 passes through the resin forming the optical cable insertion part 42a. Then, the laser beam B1 is transmitted to the core of the core wire of the optical cable 60.

As illustrated in FIG. 9, the surface S7 of the optical cable insertion part 42a has a protrusion N1, which is engaged with the engaging part 32a of the metal cap 30. The protrusion N1, which is provided between the opening A1 and the recess D3 in the x-axis direction, extends in the y-axis direction. When seen in plan view from the y-axis direction, the protrusion N1 has a substantially triangular shape that protrudes to the positive side of the z-axis direction.

As illustrated in FIGS. 9 and 10, the lower surface of the optical cable insertion part 42a has a projection C7. The projection C7 corresponds to the groove G1 of the plug placing part 222 of the light-emitting-element receptacle 220. The projection C7 extends in parallel to the x-axis from the end surface S8 toward the end surface S10.

As illustrated in FIGS. 9 and 10, the protrusion 42b protrudes to the negative side of the y-axis direction from the vicinity of an end portion located at the negative side of the x-axis direction of the optical cable insertion part 42a. Accordingly, the transmitting-side plug 42 has a substantially L-shape. The protrusion 42b functions as a grip when the transmitting-side plug 42 is inserted or removed. A lightening hole is provided at substantially the center of the protrusion 42b. The lightening hole has a substantially rectangular shape when seen in plan view from the z-axis direction.

The connection between the transmitting-side plug 42 and the light-emitting-element receptacle 220 is made by aligning the projection C7 with the groove G1, and pushing the projection C7 in to the positive side of the x-axis direction. At this time, an end surface S11 located at the positive side of the x-axis direction of the protrusion 42b abuts against an end surface S3 of the abutment part 228 of the light-emitting-element receptacle 220 illustrated in FIG. 5.

When the transmitting-side plug 42 and the light-emitting-element receptacle 220 are connected, the engaging part 32a of the metal cap 30 is engaged with the protrusion N1, and the engaging part 32c is engaged with the corner formed by the surface S7 and the end surface S8 of the transmitting-side plug 42. As a result, the transmitting-side plug 42 is fixed to the light-emitting-element receptacle 220.

The receiving-side plug 46 is used for fixing the optical cable 60 to the light-receiving-element receptacle 240. As illustrated in FIG. 9, the receiving-side plug 46 includes an optical cable insertion part 46a and a protrusion 46b.

The optical cable insertion part 46a constitutes a portion located at the negative side of the y-axis direction of the receiving-side plug 46. The optical cable insertion part 46a has a substantially rectangular parallelepiped shape that extends in the x-axis direction. An opening A2 is provided in a portion located at the negative side of the x-axis direction of the optical cable insertion part 46a. The opening A2 is a slot for inserting the optical cable 60 into the receiving-side plug 46. A resin for securing the optical cable 60 is injected into the opening A2.

The opening A2 is formed by being cut out of a surface S12 located at the top side of the optical cable insertion part 46a, and an end surface S13 located at the negative side of the x-axis direction of the optical cable insertion part 46a. At least one hole H8 is provided in the inner peripheral surface located at the positive side of the x-axis direction of the opening A2. The hole H8 is used for guiding the core wire of the optical cable 60 inserted in the opening A2 to the distal end of the receiving-side plug 46. The number of holes H8 corresponds to the number of optical cables 60, which is two in this embodiment.

Further, a recess D4 for injecting a matching agent is provided in a portion located at the positive side of the x-axis direction of the optical cable insertion part 46a. The recess D4 is recessed from the top surface toward the lower surface of the optical cable insertion part 46a.

The hole H8 is provided in the inner peripheral surface located at the negative side of the x-axis direction of the recess D4. The hole H8 communicates with the inner peripheral surface located at the positive side of the x-axis direction of the opening A2. Accordingly, the core wire of the optical cable 60 reaches the recess D4 from the opening A2 by passing through the hole H8. The end surface of the core wire of the optical cable 60 that has reached the recess D4 is located in the immediate vicinity of an inner peripheral surface S14 located at the positive side of the x-axis direction of the recess D4. A matching agent made of a transparent resin, for example, an epoxy-based resin is injected into the opening A2 and the recess D4 to fix the optical cable 60 to the receiving-side plug 46. The end surface of the core wire of the optical cable 60 is not in contact with the inner peripheral surface S14.

As illustrated in FIG. 10, a convex lens 48 is provided on an end surface S15 located at the positive side of the x-axis direction of the optical cable insertion part 46a. When seen in plan view from a direction perpendicular to the x-axis direction, the convex lens 48 has a substantially semicircular shape that protrudes to the positive side of the x-axis direction.

When seen in plan view from the x-axis direction, the convex lens 48 overlaps the optical axis of the optical cable 60. Therefore, the laser beam B2 emitted from the optical cable 60 is focused or collimated by the convex lens 48, and travels toward the total reflection surface R2. Then, the laser beam B2 is totally reflected at the total reflection surface R2, and transmitted to the light-receiving element array 50.

As illustrated in FIG. 9, the surface S12 of the optical cable insertion part 46a has a protrusion N2, which is engaged with the engaging part 32b of the metal cap 30. The protrusion N2, which is provided between the opening A2 and the recess D4 in the x-axis direction, extends in the y-axis direction. When seen in plan view from the y-axis direction, the protrusion N2 has a substantially triangular shape that protrudes to the positive side of the z-axis direction.

As illustrated in FIGS. 9 and 10, the lower surface of the optical cable insertion part 46a has a projection C8. The projection C8 corresponds to the groove G2 of the plug placing part 242 of the light-receiving-element receptacle 240. The projection C8 extends in parallel to the x-axis from the end surface S13 toward the end surface S15.

The protrusion 46b protrudes to the positive side of the y-axis direction from an end portion located at the negative side of the x-axis direction of the optical cable insertion part 46a. Accordingly, the receiving-side plug 46 has a substantially L-shape. The protrusion 46b functions as a grip when the receiving-side plug 46 is inserted or removed. A lightening hole is provided at substantially the center of the protrusion 46b. The lightening hole has a substantially rectangular shape when seen in plan view from the z-axis direction.

The connection between the receiving-side plug 46 and the light-receiving-element receptacle 240 is made by aligning the projection C8 with the groove G2, and pushing the projection C8 in to the positive side of the x-axis direction. At this time, an end surface S16 located at the positive side of the x-axis direction of the protrusion 46b abuts against an end surface S6 of the abutment part 248 of the light-receiving-element receptacle 240 illustrated in FIG. 5.

When the receiving-side plug 46 and the light-receiving-element receptacle 240 are connected, the engaging part 32b of the metal cap 30 is engaged with the protrusion N2, and the engaging part 32d is engaged with the corner formed by the surface S12 and the end surface S13 of the receiving-side plug 46. As a result, the receiving-side plug 46 is fixed to the light-receiving-element receptacle 240.

In the optical transmission module 10 configured as described above, as illustrated in FIG. 7, the laser beam B1 emitted to the positive side of the z-axis direction from the light-emitting element array 100 passes through the sealing resin 24 and the light-emitting-element receptacle 220. Further, the laser beam B1 is reflected at the total reflection surface R1 to the negative side of the x-axis direction to pass through the plug 40, and is transmitted to the core of the optical cable 60.

In the optical transmission module 10, the laser beam B2 emitted to the positive side of the x-axis direction from the optical cable 60 passes through the light-receiving-element receptacle 240. Further, the laser beam B2 is reflected at the total reflection surface R2 to the negative side of the z-axis direction to pass through the sealing resin 24, and is transmitted to the light-receiving element array 50.

Manufacturing Method; See FIGS. 11 to 16

A method of manufacturing the optical transmission module 10 will be described with reference to the drawings.

First, solder is applied to the top surface of a mother substrate, which is an aggregate of a plurality of mounting substrates 22. More specifically, by using a squeegee, solder paste is pressed onto the mother substrate on which a metal mask is placed. Then, the metal mask is removed from the mother substrate to apply the solder onto the mother substrate.

Next, a capacitor is placed on top of the solder on the mother substrate. Thereafter, the mother substrate is heated to solder the capacitor in place.

After the capacitor is soldered in place, an Ag paste is applied to a predetermined position on the mother substrate. The driving circuit 26, the light-receiving element array 50, and the light-emitting element array 100 are placed on top of the applied Ag paste, and die bonding is performed. Further, by using Au wires, the driving circuit 26 and the light-receiving element array 50 are connected by wire bonding, and further, the driving circuit 26 and the light-emitting element array 100 are connected by wire bonding.

Thereafter, the capacitor, the driving circuit 26, the light-receiving element array 50, and the light-emitting element array 100 are sealed with resin. Further, the mother substrate is cut with a dicer to obtain individual mounting substrates 22.

Figure 11:
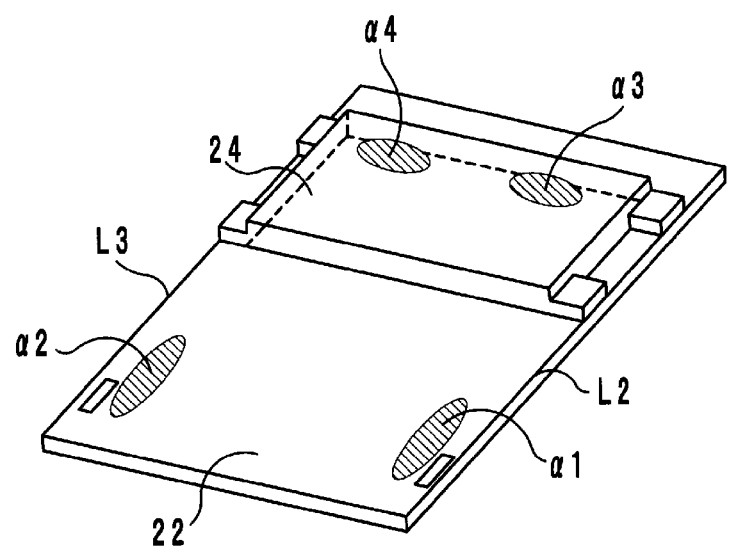
FIG. 11 is an external perspective view of the optical transmission module that is being manufactured.

Next, as illustrated in FIG. 11, a UV-curable (photosetting) adhesive is applied to portions α1 and α2 located along the outer edges L2 and L3 in the upper surface of the mounting substrate 22, and to two regions α3 and α4 located at the positive side of the x-axis direction in the upper surface of the sealing part 24a.

Figure 12:
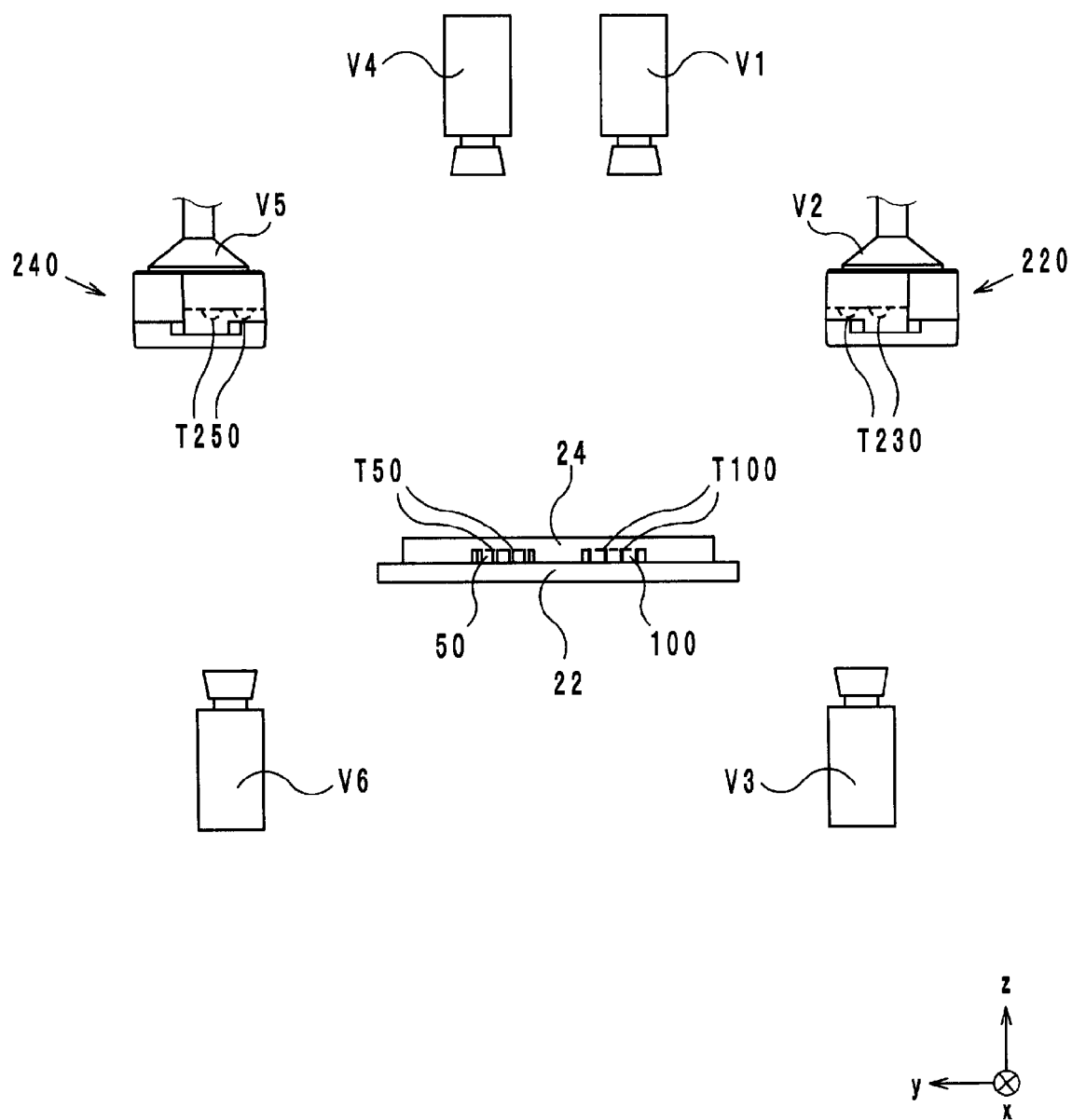
FIG. 12 illustrates a manufacturing process for the optical transmission module.

After the adhesive is applied, the light-emitting-element receptacle 220 is temporarily disposed over the mounting substrate 22 and the sealing resin 24. In the step of temporarily disposing the light-emitting-element receptacle 220, first, as illustrated in FIG. 12, the position of a center T100 of the light-emitting portion of the light-emitting element array 100 is identified with a position recognition camera V1.

Next, a mounter V2 picks up the light-emitting-element receptacle 220. Then, with the light-emitting-element receptacle 220 being sucked by the mounter V2, the position of the lens center T230 of the convex lens 230 of the light-emitting-element receptacle 220 is identified with a position recognition camera V3. The relationship between these positions may be also identified by means of position recognition markings provided by impression or the like on the sealing resin 24 and the light-emitting-element receptacle 220.

The relative positions of the light-emitting portion of the light-emitting element array 100 and the convex lens 230 are computed from data on the position of the center T100 of the light-emitting portion of the light-emitting element array 100 which is identified with the position recognition camera V1, and data on the position of the lens center T230 of the convex lens 230 of the light-emitting-element receptacle 220 which is identified with the position recognition camera V3. On the basis of the computed results, the light-emitting-element receptacle 220 is temporarily disposed over the mounting substrate 22 and the sealing resin 24 by the mounter V2 so that the light-emitting portion of the light-emitting element array 100 and the convex lens 230 face each other. In this case, in the z-axis direction, the distance between the lower surface of the optical coupling part 224 of the receptacle 200 and the lower surface of the plug placing part 222 is preferably smaller than the distance between the upper surface of the sealing resin 24 and the upper surface of the mounting substrate 22. This is to prevent interference between the plug placing part 222 and the mounting substrate 22, and allow smooth sliding movement between the lower surface of the optical coupling part 224 and the upper surface of the sealing resin 24.

Figure 13:
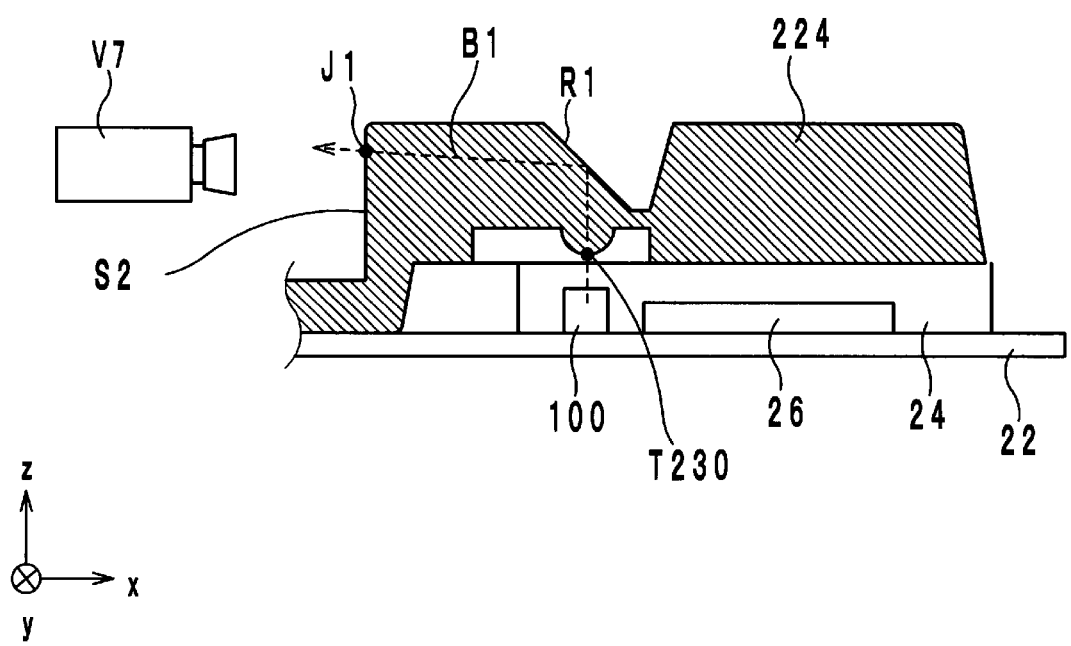
FIG. 13 is a sectional view of the optical transmission module that is being manufactured.

After the temporary disposing, the light-emitting element array 100 is driven. As a result, as illustrated in FIG. 13, the laser beam B1 emitted from the light-emitting element array 100 passes through the optical coupling part 224 and emerges from the emergence surface S2. Then, the position of a light spot J1 of the laser beam B1 on the emergence surface S2 is measured with a camera V7 from a direction perpendicular to the emergence surface S2. If the light-emitting-element receptacle 220 is formed by shaping resin by using a mold or the like, the total reflection surface R1 of the recess D1 is formed at angles that vary within a dimensional tolerance with respect to a desired angle.

Figure 14:
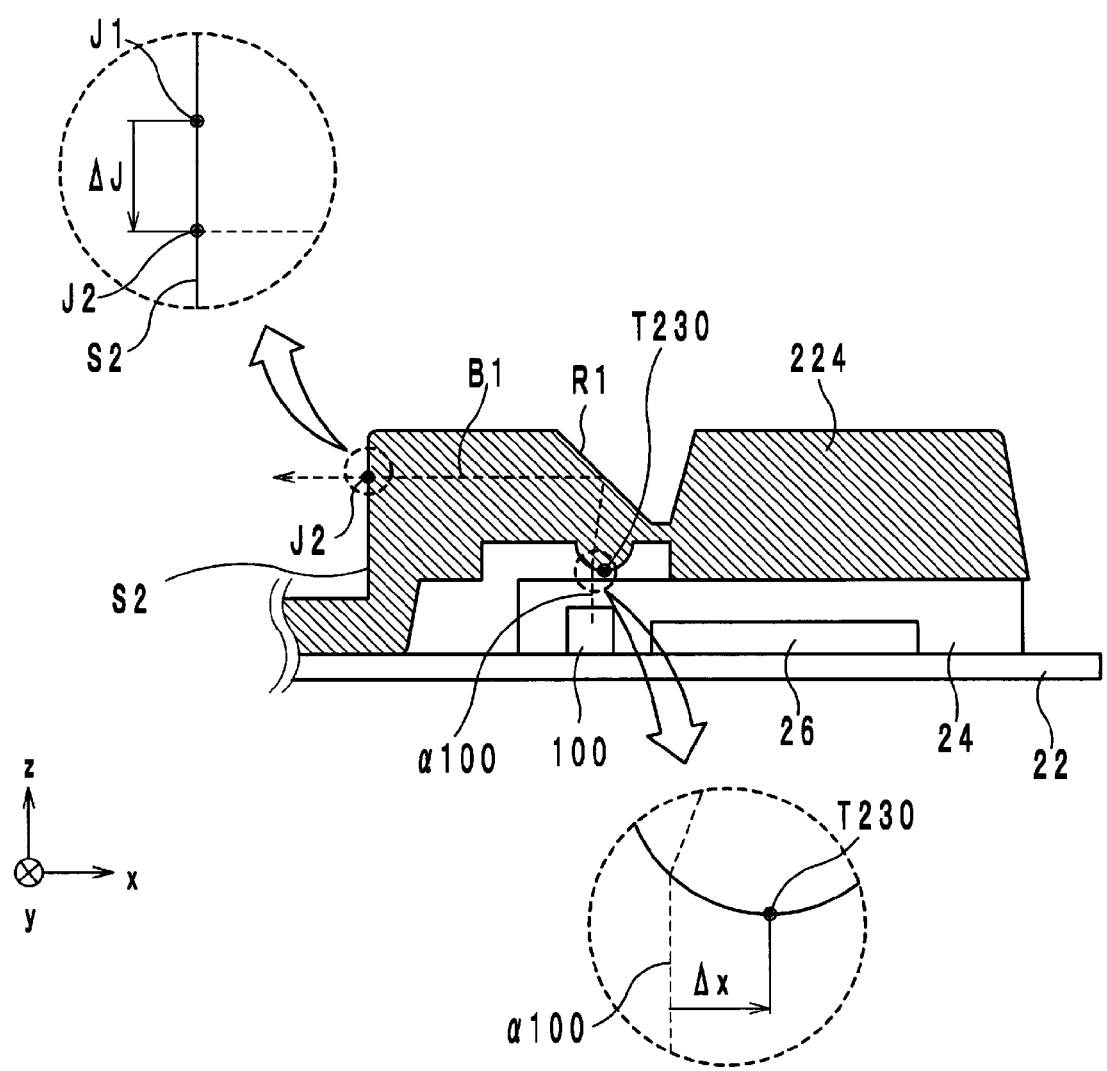
FIG. 14 is a sectional view of the optical transmission module that is being manufactured.

Next, as illustrated in FIG. 14, the lower surface of the light-emitting-element receptacle 220 is slid in a direction parallel to the upper surface of the mounting substrate 22 and placed in position, in such a way that a designed intersection point J2 of the optical axis of the optical cable 60 with the emergence surface S2, and the light spot J1 of the laser beam B1 on the emergence surface S2 are aligned with each other. That is, the lower surface of the light-emitting-element receptacle 220 and the upper surface of the mounting substrate 22 are the surfaces that are slid against each other during placement of the light-emitting-element receptacle 220. This process will be described in detail by way of example. Suppose that owing to the variations in the angle of the total reflection surface R1 mentioned above, the light spot J1 of the laser beam B1 on the emergence surface S2 is displaced to the positive side of the z-axis direction by ΔJ from the designed intersection point J2. In this case, as illustrated in FIG. 14, the position of the lens center T230 of the convex lens 230 is moved by a distance Δx from the optical axis α100 of the light-emitting element array 100 to the positive side of the x-axis direction. Then, refraction by the convex lens 230 changes the angle of incidence of the laser beam B1 on the total reflection surface R1 of the recess D1. As a result, the light spot J1 moves to the negative side of the z-axis direction, thus allowing the position of the light spot J1 to be corrected so as to overlap the designed intersection point J2. That is, the displacement ΔJ of the light spot J1 to the positive side of the z-axis direction with respect to the intersection point J2 may be corrected easily by simply moving the lower surface of the light-emitting-element receptacle 220 in a direction parallel to the upper surface of the mounting substrate 22 in the x-y plane. In this way, making use of refraction by the convex lens 230 makes it possible to correct the displacement of the position of the light spot J1 with respect to the intersection point J2 in not only the z-axis direction but also the y-axis direction. At this time, a design value of the coordinate of the intersection point J2 is set in advance by using CAD or the like.

Further, light that travels in the z-axis direction is reflected to the x-axis direction, thus ensuring that the position of the light spot J1 on the emergence surface S2 is adequately corrected, without increasing the thickness of the optical transmission module 10 in the z-axis direction.

In parallel with the process mentioned above, the light-receiving-element receptacle 240 is temporarily disposed and then placed in position over the mounting substrate 22 and the sealing resin 24. More specifically, as illustrated in FIG. 12, after a UV-curable adhesive is applied, the position of a center T50 of the light-receiving portion of the light-receiving element array 50 is identified with a position recognition camera V4.

Next, a mounter V5 picks up the light-receiving-element receptacle 240. Then, with the light-receiving-element receptacle 240 being sucked by the mounter V5, the position of the lens center T250 of the convex lens 250 of the light-receiving-element receptacle 240 is identified with a position recognition camera V6.

The relative positions of the light-receiving portion of the light-receiving element array 50 and the convex lens 250 are computed from data on the position of the center T50 of the light-receiving portion of the light-receiving element array 50 which is identified with the position recognition camera V4, and data on the position of the lens center T250 of the convex lens 250 of the light-receiving-element receptacle 240 which is identified with the position recognition camera V6. On the basis of the computed results, the mounter V5 is moved to temporarily dispose the light-receiving-element receptacle 240 over the mounting substrate 22 and the sealing resin 24.

Figure 15:
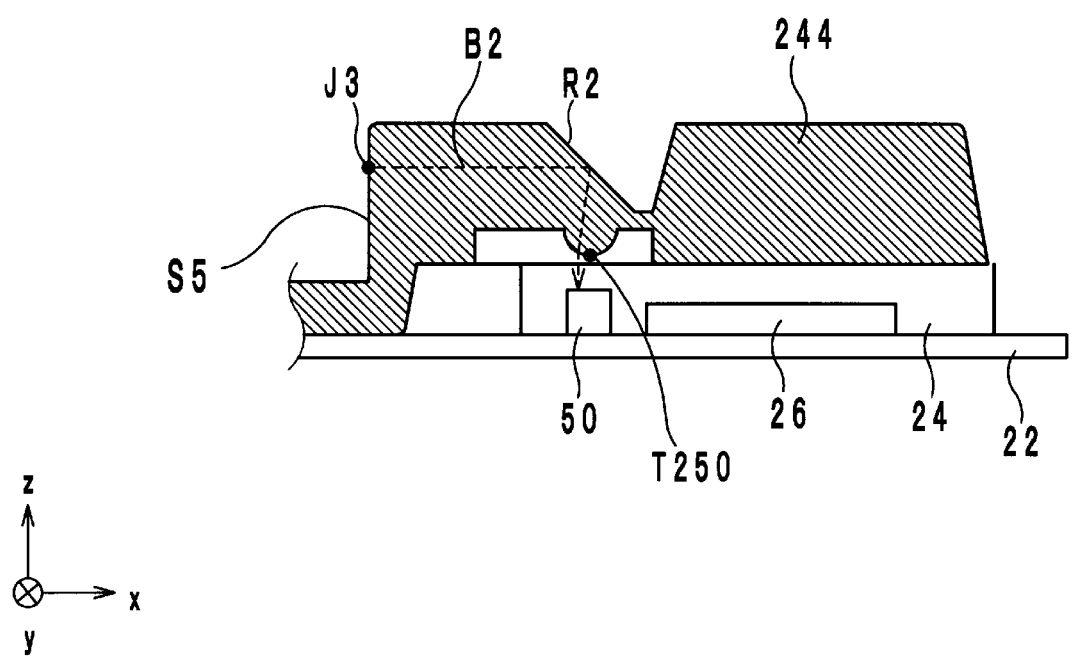
FIG. 15 is a sectional view of the optical transmission module that is being manufactured.
Figure 16:
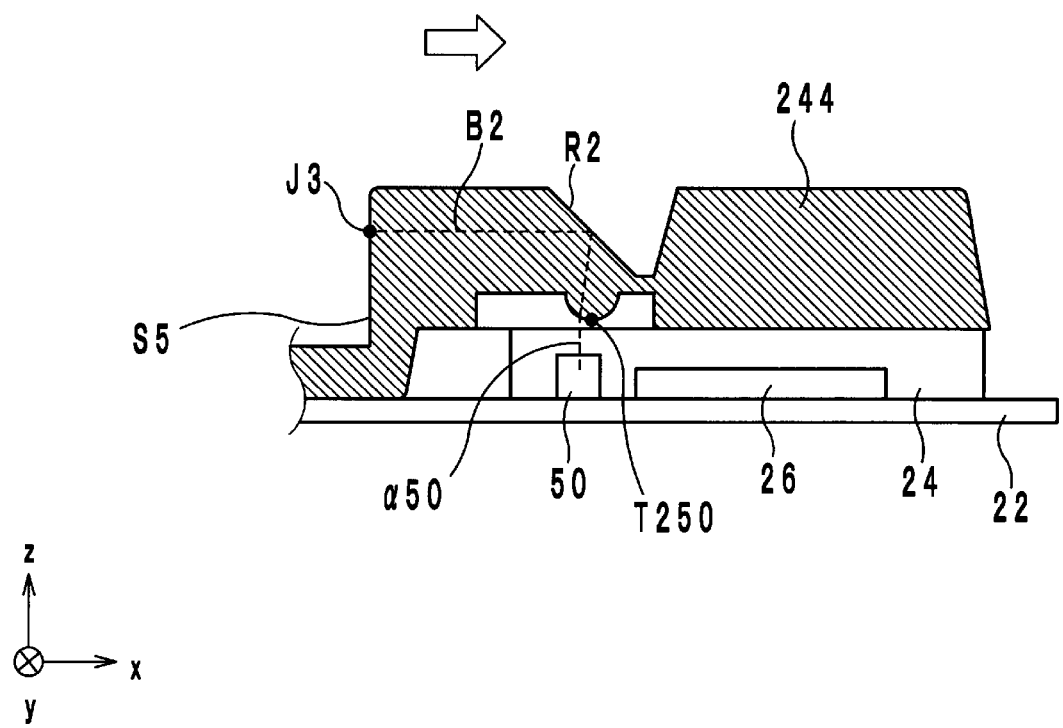
FIG. 16 is a sectional view of the optical transmission module that is being manufactured.

Next, as illustrated in FIG. 15, the laser beam B2 is caused to enter from a designed intersection point J3 of the optical axis of the optical cable 60 with the incidence surface S5. Then, as illustrated in FIG. 16, the light-receiving-element receptacle 240 is placed at a position where the output from the light-receiving element array 50 that has received the laser beam B2 becomes strongest. At this time, movement of the light-receiving-element receptacle 240 is performed by sliding the light-receiving-element receptacle 240 in a direction parallel to the major surface of the mounting substrate 22. At this time, the coordinate of the intersection point J3 is set in advance by using CAD or the like.

The receptacle 200 that has been placed in position is irradiated with ultraviolet rays. During the ultraviolet irradiation, the light-emitting-element receptacle 220 and the light-receiving-element receptacle 240 are pressed against the mounting substrate 22 and the sealing resin 24 by the mounters V2 and V5, respectively. Therefore, as the UV-curable adhesive located between each of the light-emitting-element receptacle 220 and the light-receiving-element receptacle 240 and the sealing resin 24 cures, the light-emitting-element receptacle 220 and the light-receiving-element receptacle 240 are fixed to the mounting substrate 22 and the sealing resin 24 without causing positional displacement.

Next, the metal cap 30 is attached to the mounting substrate 22 to which the receptacle 200 has been fixed. Specifically, a thermosetting adhesive such as an epoxy-based adhesive is applied to the following portions of the upper surface of the mounting substrate 22: the space H1 between the leg parts 24b and 24c of the sealing resin 24; the space H2 between the leg parts 24d and 24e of the sealing resin 24; and portions with which the projections C2 and C5 of the metal cap 30 come into contact. Further, a conductive paste of Ag or the like is applied to the ground-conductor exposed parts E2 and E3 of the mounting substrate 22.

After the adhesive and the conductive paste are applied, the projection C3 of the metal cap 30 is fit into a portion on the mounting substrate 22 which is sandwiched by the leg parts 24b and 24c of the sealing resin 24, that is, the space H1. Further, the projection C6 is fit into a portion sandwiched by the leg parts 24d and 24e of the sealing resin 24, that is, the space H2. As a result, the position of the metal cap 30 with respect to the mounting substrate 22 is determined. Simultaneously with this positioning of the metal cap 30, the projections C1 to C6 come into contact with the adhesive or conductive paste on the mounting substrate 22.

After the metal cap 30 is fit to the mounting substrate 22, the mounting substrate 22 is heated by using an oven, causing the adhesive or conductive paste to set, thereby fixing the metal cap 30 to the mounting substrate 22. At this time, when the metal cap 30 is attached to the mounting substrate 22, the projections C1 and C4 of the metal cap 30 come into contact with the ground-conductor exposed parts E2 and E3 of the mounting substrate 22, respectively. As a result, the metal cap 30 is connected to the ground conductor inside the mounting substrate 22, and maintained at the ground potential. Lastly, the optical transmission module 10 is completed through the steps mentioned above.

Advantageous Effects

In the method of manufacturing the optical transmission module 10 (to be referred to as "manufacturing method" hereinafter), first, the light-emitting-element receptacle 220 is temporarily disposed over the mounting substrate 22 and the sealing resin 24 so that the convex lens 230 provided to the light-emitting-element receptacle 220 and the light-emitting element array 100 face each other. Thereafter, the light-emitting-element receptacle 220 is moved and placed in position on the basis of information on the position of the light spot J1 of the laser beam B1, which is emitted from the light-emitting element array 100, on the emergence surface S2, and information on the position of the designed intersection point J2 of the optical axis of the optical cable 60 with the emergence surface S2 of the light-emitting-element receptacle 220. During this movement, the laser beam B1 passes through the convex lens 230. Accordingly, the laser beam B1 is refracted by the convex lens 230, causing the optical axis of the laser beam B1 to change direction. In the manufacturing method, this change in the direction of the optical axis is utilized so that the light-emitting element array 100 and the optical cable 60 may be optically coupled by simply sliding the sliding surface of the light-emitting-element receptacle 220 on a sliding surface located in the x-y plane of the mounting substrate 22, without rotating the light-emitting-element receptacle 220.

For the light-receiving-element receptacle 240 as well, the laser beam B2 is refracted by the convex lens 250, and thus the direction of its optical axis changes. This change in the direction of the optical axis is utilized so that the light-receiving element array 50 and the optical cable 60 may be optically coupled through combination of linear movements of the light-receiving-element receptacle 240 over the mounting substrate 22 in the x-axis and y-axis directions in the x-y plane, without rotating the light-receiving-element receptacle 240.

Further, in the method of manufacturing the optical transmission module 10, as illustrated in FIG. 13, the position of the light spot J1 of the laser beam B1 on the emergence surface S2 is measured with the camera V7 from a direction perpendicular to the emergence surface S2. Then, as illustrated in FIG. 14, the light-emitting-element receptacle 220 is slid in a direction parallel to the major surface of the mounting substrate 22 and placed over the mounting substrate 22, in such a way that the designed intersection point J2 of the optical axis of the optical cable 60 with the emergence surface S2, and the position of the light spot J1 of the laser beam B1 on the emergence surface S2 are aligned with each other. That is, in the method of manufacturing the optical transmission module 10, the laser beam B1 emerging from the light-emitting-element receptacle 220 is directly identified with the camera V7, and the optical axis of the optical cable 60 is aligned with the laser beam B1. Therefore, the method of manufacturing the optical transmission module 10 provides lower optical loss, as compared with the case where the optical cable 60 and the light-emitting element array 100 are optically coupled solely by placing the light-emitting-element receptacle 220 over the mounting substrate 22 and the sealing resin 24 so that the light-emitting portion of the light-emitting element array 100 and the convex lens 230 face each other.

For the light-receiving-element receptacle 240 as well, the light-receiving-element receptacle 240 is placed at a position where the output from the light-receiving element array 50 that has received the laser beam B2 becomes strongest. Therefore, the method of manufacturing the optical transmission module 10 provides lower optical loss, as compared with the case where the optical cable 60 and the light-receiving element array 50 are optically coupled solely by placing the light-receiving-element receptacle 240 over the mounting substrate 22 and the sealing resin 24 so that the light-receiving portion of the light-receiving element array 50 and the convex lens 250 face each other.

Figure 17:
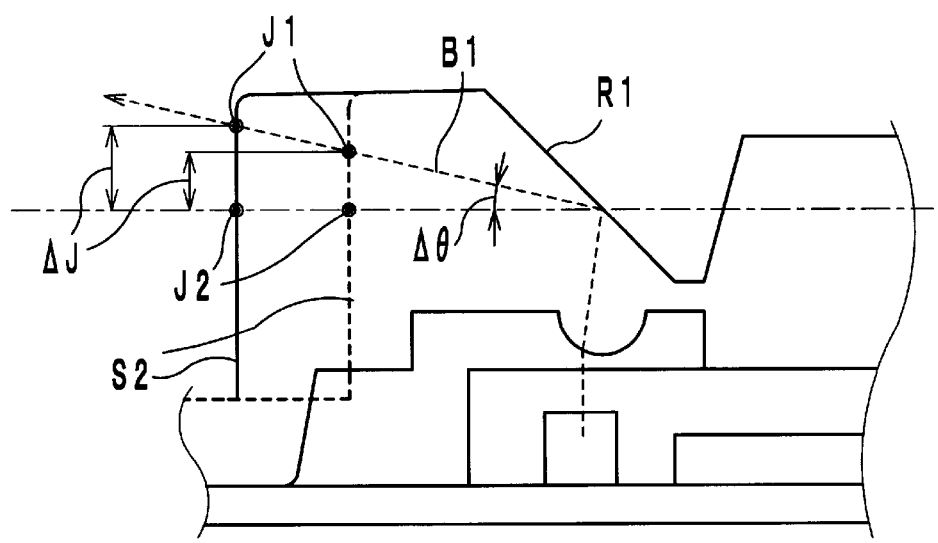
FIG. 17 is a sectional view of the optical transmission module that is being manufactured.

In optically coupling the light-emitting element array 100 and the optical cable 60, the laser beam B1 emitted from the light-emitting element array 100 preferably passes through a long distance in the receptacle 200. This is because, as illustrated in FIG. 17, as the distance the laser beam B1 passes through in the receptacle 200 becomes longer, the amount of displacement ΔJ of the light spot J1 on the emergence surface S2 with respect to the intersection point J2 becomes greater even with a slight displacement Δθ of the optical axis, thus making it possible to easily identify the displacement Δθ of the optical axis. The ability to easily identify the displacement Δθ of the optical axis makes it possible to optically couple the optical cable 60 and the light-emitting element array 100 with good accuracy. In the light-emitting-element receptacle 220, the laser beam B1, which is emitted from the light-emitting element array 100 and travels to the positive side of the z-axis direction, is reflected at the total reflection surface R1 to travel to the negative side of the x-axis direction. As a result, in the light-emitting-element receptacle 220, the laser beam B1 is allowed to pass through a long distance in the light-emitting-element receptacle 220, without increasing the thickness in the z-axis direction, that is, while keeping the height of the optical transmission module 10 low. For the light-receiving-element receptacle 240 as well, the laser beam B2 from the optical cable 60 is reflected, and therefore the same advantageous effect as the light-emitting-element receptacle 220 can be obtained.

The receptacle 200 utilizes not simple reflection but total reflection to bend the optical path connecting the optical cable 60 and each of the light-emitting element array 100 and the light-receiving element array 50. Therefore, it is not required to evaporate a metal film onto the total reflection surfaces R1 and R2. That is, because the receptacle 200 utilizes total reflection, manufacture of the receptacle 200 is easy in comparison to the case where simple reflection is utilized.

Further, the receptacle 200 is fabricated by using a single light-transmitting resin material. Therefore, the manufacturing process of the receptacle 200 may be simplified in comparison to the case where the receptacle 200 is made of a plurality of materials. As a result, the influence of variations in manufacturing due to the mold used in this manufacturing process may be reduced.

Other Embodiments

The optical transmission module and the method of manufacturing an optical transmission module according to the present disclosure is not limited to the optical transmission module 10 and its manufacturing method according to the above-mentioned embodiment but may be modified within the scope of the present disclosure. In the above-mentioned embodiment, for the sake of convenience, the light-emitting-element receptacle 220 and the light-receiving-element receptacle 240 are moved to the positive side of the x-axis direction in FIGS. 14 and 16. However, in actuality, the light-emitting-element receptacle 220 and the light-receiving-element receptacle 240 are moved two-dimensionally in a plane perpendicular to the z-axis direction.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A method of manufacturing an optical transmission module, the optical transmission module being connected to an optical cable, the optical transmission module including a mounting substrate, a photoelectric conversion element provided on the mounting substrate, and a receptacle that optically couples the photoelectric conversion element and the optical cable, the receptacle having a lens provided on a surface that faces the photoelectric conversion element, the method comprising:

temporarily disposing the receptacle over the mounting substrate so that the lens and the photoelectric conversion element face each other;

measuring, after the temporarily disposing, a position of a light spot at which light emitted from the photoelectric conversion element emerges from an emergence surface of the receptacle;

determining a displacement distance between the measured position of the light spot on the emergence surface and a predetermined intersection position on the emergence surface, wherein the predetermined intersection position corresponds to an intersection point between the emergence surface of the receptacle and an optical axis of the optical cable; and adjusting the position of the receptacle over the mounting substrate to thereby cause the measured position of the light spot to move along the displacement distance towards the predetermined intersection position until the measured position of the light spot overlaps with the predetermined intersection position.

2. The method of manufacturing an optical transmission module according to claim 1, wherein the adjusting includes moving the receptacle by sliding the receptacle over the mounting substrate.

* * * * *